US006786050B1

United States Patent
Okada et al.

(10) Patent No.: US 6,786,050 B1
(45) Date of Patent: Sep. 7, 2004

(54) SYSTEM AND METHOD FOR OIL FUEL BURNING INTEGRATED COMBINED CYCLE POWER GENERATION

(75) Inventors: Tsuyoshi Okada, Kanagawa (JP); Yoshinori Mashiko, Kanagawa (JP); Tomoyoshi Sasaki, Kanagawa (JP); Makoto Inomata, Kanagawa (JP)

(73) Assignee: JGC Corporation, Tokyo (JP)

( * ) Notice: Subject to any disclaimer, the term of this patent is extended or adjusted under 35 U.S.C. 154(b) by 148 days.

(21) Appl. No.: 10/129,177

(22) PCT Filed: Nov. 13, 2000

(86) PCT No.: PCT/JP00/07988

§ 371 (c)(1),
(2), (4) Date: Aug. 20, 2002

(87) PCT Pub. No.: WO01/36566

PCT Pub. Date: May 25, 2001

(30) Foreign Application Priority Data

Nov. 15, 1999 (JP) .......................................... 11-323504

(51) Int. Cl.[7] ................................................ F02C 3/20
(52) U.S. Cl. ...................... 60/780; 60/39.12; 60/39.182; 60/34.463
(58) Field of Search ........................ 60/39.12, 39.182, 60/39.463, 780, 781

(56) References Cited

U.S. PATENT DOCUMENTS

| 4,160,479 A | * | 7/1979 | Richardson et al. ........ 166/267 |
| 4,472,936 A | * | 9/1984 | Uchiyama et al. ............ 60/773 |
| 5,121,600 A | * | 6/1992 | Sanders et al. .......... 60/39.464 |

FOREIGN PATENT DOCUMENTS

WO     WO 98/00477     *   1/1998

* cited by examiner

*Primary Examiner*—Louis J. Casaregola
(74) *Attorney, Agent, or Firm*—Andrus, Sceales, Starke & Sawall, LLP (57) ABSTRACT

A light portion is extracted from feed oil by a separation system. The light portion is then subject to a hydrotreatment to obtain impurity-removed fuel oil which is stored in an intermediate tank. A residue of the feed oil after extraction of the light portion is gasified to obtain syngas (H2 gas+CO gas) which is used as basic fuel for power generation in a power generation system. The fuel oil is fed to the power generation system as auxiliary fuel for supplementing the power generation based on the syngas. The power generation system includes a plurality of gas turbines and generators. The number of the gas turbines to be driven by the fuel oil is controlled to adjust the power generation amount depending on demand.

20 Claims, 4 Drawing Sheets

SYSTEM AND METHOD FOR OIL FUEL BURNING INTEGRATED COMBINED CYCLE POWER GENERATION

BACKGROUND OF THE INVENTION

1. Field of the Invention

The present invention relates to a system and method for oil fuel burning integrated combined cycle power generation.

2. Description of the Related Art

In the integrated combined cycle power generation where oil fuel is burned for the power generation, the power generation is carried out by rotating a gas turbine using combustion gas obtained by burning fuel gas and the power generation is further carried out by rotating a steam turbine with steam which is produced by recovering waste heat from high-temperature exhaust gas discharged from the gas turbine. This type of the integrated combined cycle power generation can achieve the thermal efficiency of about 49% in gross heating value to realize the effective utilization of the energy.

A technique of combining a power generation system for carrying out such integrated combined cycle power generation and a fuel producing system for producing gas turbine fuel oil is described in JP-A-9-189206 and so on. For example, JP-A-189206 describes that in the fuel producing system, crude oil is distilled to be separated into a low boiling point fraction and a high boiling point fraction and the low boiling point fraction is fed to a fuel oil tank using a pump, then the fuel oil is sent from the tank to a combustor of a gas turbine system in the power generation system via a transport line to drive a gas turbine, while the high boiling point fraction is used as boiler fuel for driving a steam turbine.

On the other hand, for producing as much power as possible from one unit calorie of feed oil, it is necessary to draw light oil for a gas turbine from the feed oil at high rate. However, if the light oil is extracted at the high rate, residue oil becomes highly viscous, and further, the contents of impurities, e.g. heavy metal such as vanadium, and sulfur, increase.

When the residue oil containing much heavy metal is used as boiler fuel, the flame temperature of a burner in a boiler increases up to about 1300° C. which exceeds melting temperatures of the impurities such as vanadium contained in the residue oil. Among the melted impurities, melted vanadium which adheres to a metal surface of the inside of the, boiler causes high-temperature corrosion. Accordingly, when high-impurity residue oil containing, for example, vanadium no less than 100 ppm is used as boiler fuel, it is necessary to prepare a boiler combustion furnace with a special structure which can prevent an occurrence of excessively-high-temperature portions, whose volume is large enough and where it is necessary to add a neutralizer such as magnesium upon burning the boiler fuel. Thus, there is raised a cost problem, such as an increase in operation cost and construction cost.

Further, the efficiency of the boiler power generation using the residue oil is as low as 40% or less which is lower than that of the general gas turbine power generation. Therefore, even if the light oil obtained from the feed oil is used as fuel for the gas turbine power generation and the residue oil (heavy oil) is used as fuel for the boiler power generation, the total efficiency only becomes as low as about 44% to 48%.

SUMMARY OF THE INVENTION

Therefore, it is an object of the present invention to provide an improved oil fuel burning integrated combined cycle power generation system which can effectively utilize feed oil to carry out power generation.

It is another object of the present invention to provide an improved oil fuel burning integrated combined cycle power generation method which can effectively utilize feed oil to carry out power generation.

According to one aspect of the present invention, there is provided an oil fuel burning integrated combined cycle power generation system comprising: a fuel producing system comprising a separation means for separating feed oil composed of a crude oil and/or heavy oil into a light portion and a heavy portion, and a refining means for refining the light portion to obtain fuel oil; a gasification system for gasifying the heavy portion to produce syngas containing hydrogen gas and carbon monoxide gas; a gas turbine power generation system for driving a gas turbine using the fuel oil and the syngas as fuel to carry out power generation; and a steam turbine power generation system for driving a steam turbine using steam produced by heat recovered from exhaust gas of the gas turbine to carry out power generation.

It may be arranged that the fuel producing system comprises a tank for storing the fuel oil, and the gas turbine power generation system requires a constant supply of the syngas from the gasification system as basic fuel and further requires a supply of the fuel oil from the tank as auxiliary fuel for adjusting a power generation amount depending on power demand.

It may be arranged that the separation means comprises a distillation means and a solvent deasphalting means, and that the refining means comprises a hydrotreating unit for refining the light portion to satisfy a gas turbine fuel specification.

It may be arranged that the gas turbine power generation system comprises a compressor connected to the gas turbine for producing compressed air to be fed to a combustor of the gas turbine, and that the gasification system carries out partial oxidation of the heavy portion using the compressed air fed from the compressor.

It may be arranged that the oil fuel burning integrated combined cycle power generation system further comprises an oxygen separation unit provided between the gas turbine power generation system and the gasification system, wherein the gas turbine power generation system comprises a compressor connected to the gas turbine for producing compressed air to be fed to a combustor of the gas turbine, wherein the oxygen separation unit carries out low-temperature separation of oxygen from part of the compressed air fed from the compressor, and wherein the gasification system carries out partial oxidation of the heavy portion using oxygen fed from the oxygen separation unit.

It may be arranged that the oil fuel burning integrated combined cycle power generation system further comprises an oxygen producing unit for separating oxygen from air using a pressure swing adsorption method, wherein the gasification system carries out partial oxidation of the heavy portion using oxygen fed from the oxygen producing unit.

It may be arranged that the separation means comprises a distillation means and a solvent deasphalting means, that the heavy portion fed to the gasification system is a residue separated by the solvent deasphalting means from a heavy portion of the feed oil obtained by the distillation means, and that the residue is uniformly dispersed into water and fed to the gasification system as water slurry fuel.

It may be arranged that the gas turbine power generation system has a power generation capacity which is greater than a power generation amount obtainable by using all the amount of the syngas produced in the gasification system.

It may be arranged that the gas turbine power generation system carries out mixed combustion of the fuel oil in a liquid phase and the syngas in a gaseous phase.

It may be arranged that the, gas turbine power generation system comprises a plurality of gas turbines including the gas turbines each driven by the syngas and the gas turbines each driven by the fuel oil.

It may be arranged that the syngas is constantly fed to the corresponding gas turbines as basic fuel, while the fuel oil is fed to the corresponding gas turbines as auxiliary fuel for adjusting a power generation amount depending on power demand.

According to another aspect of the present invention, there is provided an oil fuel burning integrated combined cycle power generation method comprising: a fuel producing step of separating essentially all the amount of feed oil composed of a crude oil and/or heavy oil into a light portion satisfying a gas turbine fuel specification and a heavy portion being a residue of the feed oil after separation of the light portion therefrom; a gasification step of gasifying essentially all the amount of the heavy portion through partial oxidation to produce syngas containing hydrogen gas and carbon monoxide gas; a gas turbine power generation step of carrying out power generation based on essentially all the amount of the syngas supplied as basic fuel and further based on the light portion supplied as auxiliary fuel for adjusting a power generation amount depending on power demand; and a steam turbine power generation step of carrying out power generation using steam produced by high-temperature exhaust gas obtained in the gas turbine power generation step.

It may be arranged that the gasification step disperses the heavy portion into water uniformly to form water slurry fuel when the heavy portion obtained in the fuel producing step has a softening point higher than 140° C., and then gasifies the water slurry fuel to produce the syngas, that the gasification step forms the heavy portion into emulsion fuel when the softening point is higher than 110° C. and no higher than 140° C., and then gasifies the emulsion fuel to produce the syngas, and that the gasification step keeps the heavy portion as it is in a high-temperature state when the softening point is no higher than 110° C., and then gasifies the heavy portion to produce the syngas.

It may be arranged that the fuel producing step comprises a distillation separating step, a solvent deasphalting separation step and a refining step for refining through a hydrotreatment the light portion obtained through the distillation separating step and the solvent deasphalting separation step.

It may be arranged that the gasification step uses compressed air produced in the gas turbine power generation step to carry out the partial oxidation.

It may be arranged that the oil fuel burning integrated combined cycle power generation method further comprises the step of producing oxygen through low-temperature separation from compressed air produced in the gas turbine power generation step, wherein the gasification step carries out the partial oxidation using the produced oxygen.

It may be arranged that the oil fuel burning integrated combined cycle power generation method further comprises the step of producing oxygen using a pressure swing adsorption method, wherein the gasification step carries out the partial oxidation using the produced oxygen.

It may be arranged that the fuel producing step comprises a distillation separating step of separating the feed oil into a first light portion and a first heavy portion, and a solvent deasphalting separation step of separating the first heavy portion into a second light portion and a second heavy portion whose pitch softening point is higher than 140° C., and that the gasification step disperses the second heavy portion into water uniformly to produce water slurry fuel, and then gasifies the water slurry fuel through the partial oxidation.

It may be arranged that the gas turbine power generation step carries out mixed combustion for simultaneously burning the light portion in a liquid phase and the syngas in a gaseous phase.

It may be arranged that the gas turbine power generation step separately carries out the power generation using the syngas and the power generation using the light portion, and that the power generation using the syngas is carried out as basic power generation, while the power generation using the light portion is carried out as auxiliary power generation for supplementing the basic power generation.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, a preferred embodiment of the present invention will be described hereinbelow with reference to the accompanying drawings.

Figure 1:
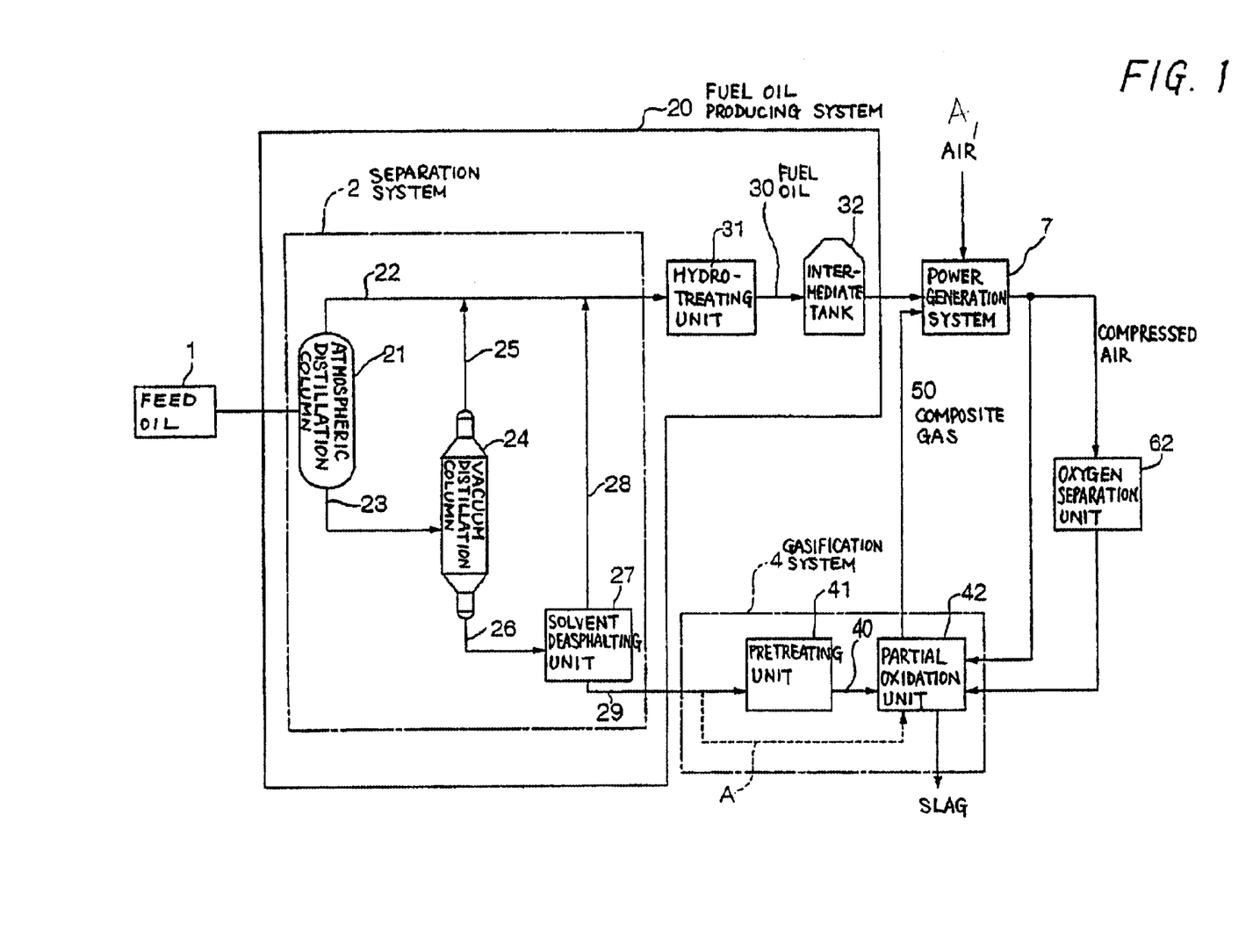
FIG. 1 is a diagram schematically showing the overall structure of an oil fuel burning integrated combined cycle power generation system according to a preferred embodiment of the present invention.

FIG. 1 is a diagram schematically showing the overall structure of an oil fuel burning integrated combined cycle power generation system according to the preferred embodiment of the present invention.

In FIG. 1, feed oil 1 is separated into a light portion and a heavy portion in a separation system 2 of a fuel oil producing system 20. From the light portion, fuel oil (light refined oil) 30 is obtained at a hydrotreating unit 31. The fuel oil 30 is temporarily stored in an intermediate tank 32 and then, when necessary, supplied to a gas turbine power generation system 5 (see FIG. 3) of a power generation system 7 as gas turbine fuel. On the other hand, the heavy portion is gasified in a gasification system 4 so that syngas 50 is obtained. The syngas 50 is also used as gas turbine fuel. Accordingly, in this embodiment, the oil fuel burning integrated combined cycle power generation system can utilize essentially all the amount of the feed oil for producing gas turbine fuel.

The feed oil 1 may be crude oil or heavy oil, or a mixture of crude oil and heavy oil. The heavy oil also includes atmospheric residue oil or vacuum residue oil. In the following explanation, it is assumed that feed oil, such as the Arabian extra light crude oil, which contains less impurities and makes it possible to recover a large amount of gas turbine fuel is used as the feed oil 1. The feed oil is first subject to a desalting treatment in a desalting section (not shown). In the desalting treatment, the feed oil and water are mixed together to transfer salt and mud matters into an aqueous phase, thereby to remove alkali metal which adversely affects a gas turbine. The feed oil 1 thus desalted is sent to the separation system 2.

In the separation system 2, the feed oil 1 is first fed to an atmospheric distillation column 21 as a distillation means where the feed oil 1 is separated into light oil (atmospheric light oil) 22 having a boiling point below, for example, 340° C. to 370° C. and atmospheric residue oil 23 having a higher boiling point. Thereafter, the atmospheric residue oil 23 is heated to a predetermined temperature in a heating furnace (not shown) and then fed to a vacuum distillation column 24 as a distillation means where the atmospheric residue oil 23 is separated into vacuum light oil 25 being a light component in the atmospheric residue oil 23 and having an atmospheric boiling point below, for example, 565° C. and vacuum residue oil (heavy portion) 26 being a heavy component.

Since the relatively high-quality feed oil is used in this embodiment as described above, the vacuum residue oil 26 can be further separated into deasphalted oil 28 being a light portion and a heavy portion 29 being a residue in a solvent deasphalting unit 27 as a solvent extracting means. This separation is carried out such that, for example, the vacuum residue oil 26 and a solvent are supplied into a column from upper and lower sides thereof to achieve a countercurrent contact therebetween, thereby to separate the vacuum residue oil 26 into a light portion and a heavy portion according to a difference in solubility to the solvent. The thus obtained deasphalted oil 28 being a light portion is mixed into the light oil 22 along with the vacuum light oil 25 and fed to the hydrotreating unit 31 as a refining means. The foregoing operation performed in the separation system 2 for recovering as much light portion as possible is called deep drawing wherein, for example, the light portion which is nearly 80 vol % of the feed oil 1 is recovered as fuel oil in the separation system 2. Accordingly, the heavy portion 29 being a residue after recovery of a large amount of the light portion is highly viscous and is thus obtained as a solid pitch having a pitch softening point no less than, for example, 140° C.

In the hydrotreating unit 31, the light oil 22 (mixed with the vacuum light oil 25 and the deasphalted oil 28) and compressed hydrogen gas sent from a hydrogen plant (not shown) are caused to pass a catalyst bed, thereby to remove impurities such as a small amount of metal, sulfur and nitrogen entering into hydrocarbon molecules of the light oil 22. The impurity-removed light oil (light refined oil) 22 is in a liquid phase at ordinary temperature and stored in the intermediate tank 32 as the fuel oil 30 which is supplied to the gas turbine power generation system 5 when necessary.

The fuel oil 30 corresponds to gas turbine fuel oil or a light portion satisfying a gas turbine fuel specification recited in claims.

On other hand, the heavy portion 29 is fed to the gasification system 4. Since it is difficult to handle (i.e. store/transfer) the heavy portion 29 as it is at normal temperature, the heavy portion 29 is formed into a slurry in a pretreating unit 41. In the pretreating unit 41, the heavy portion 29 in the form of, for example, a cooled solid pitch is comminuted and then added with water and a dispersing agent to be formed into a residue-water slurry 40 using a residue-water mixture apparatus.

Figure 2:
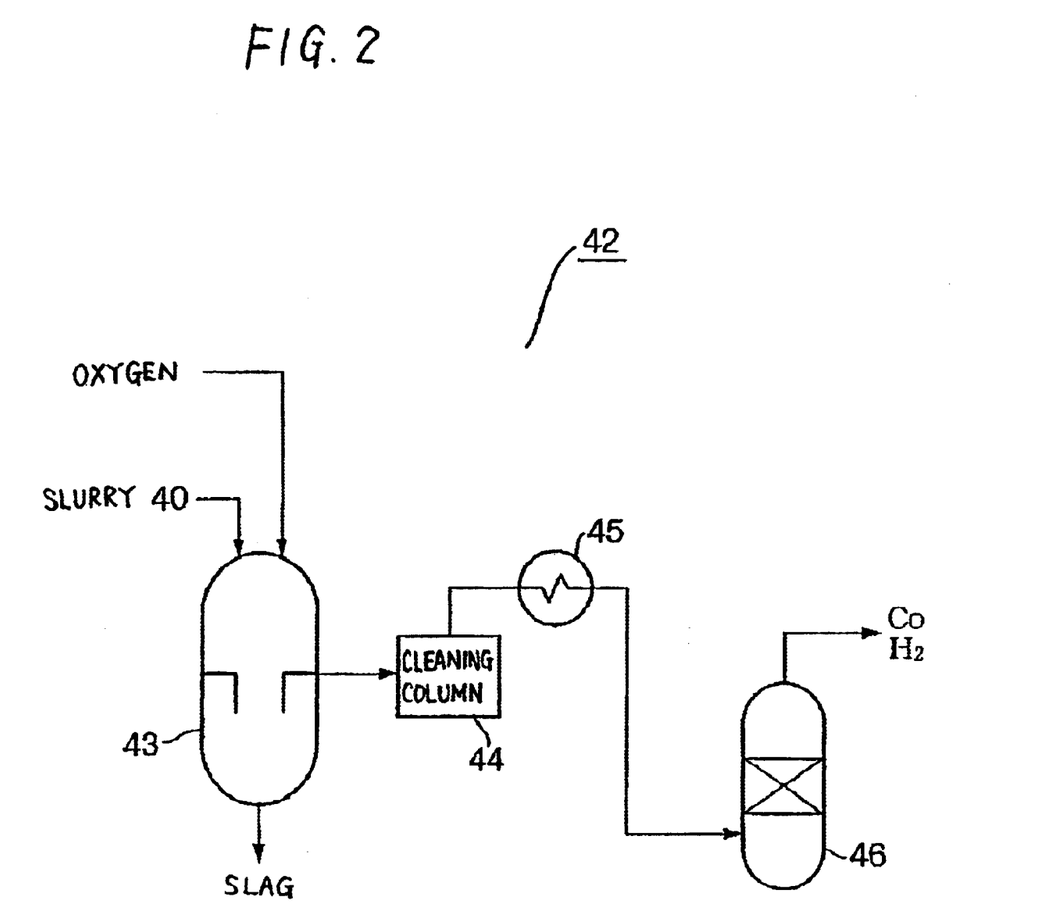
FIG. 2 is a diagram schematically showing a structure of a partial oxidation unit incorporated in the oil fuel burning integrated combined cycle power generation system shown in FIG. 1.

The slurry 40 adjusted in viscosity by the residue-water mixture apparatus is gasified in a partial oxidation unit 42. FIG. 2 is a diagram schematically showing a structure of the partial oxidation unit 42. In the partial oxidation unit 42, the slurry 40 and high-pressure steam are heated in advance and injected into a reactor 43 along with oxygen, and then separated into slag and gas containing CO (carbon monoxide) and $H_2$ (hydrogen) as main components through a partial oxidation reaction under a process condition of for example, 1200° C. to 1500° C. and 2 to 85 kg/cm$^2$. The thus obtained gas is rapidly cooled to, for example, 200 to 260° C. by water in a quenching room provided on a lower side of the reactor 43, so that most of non-reacted carbon is removed. Then, the gas is sent to a cleaning column 44 where slightly remaining non-reacted carbon is completely removed, and then sent to a heat exchanger 45 where the gas is cooled to an ordinary temperature. Thereafter, in an acid gas absorbing column 46, $H_2S$ is selectively absorbed and part of acid gas such as $CO_2$ is also absorbed so that the syngas 50 composed of high-purity CO gas and $H_2$ gas is obtained which can be used as gas turbine fuel. Between the gasification system 4 and the power generation system 7 is provided an expander (not shown) for reducing the pressure of the syngas 50 when necessary.

Oxygen separated from air in an oxygen separation unit 62 is used in the partial oxidation unit 42. When the amount of oxygen exceeding, for example, 10000 Nm$^3$/h is required in the partial oxidation unit 42, an air low-temperature processing unit is used as the oxygen separation unit 62. The air low-temperature processing unit liquefies the air at extremely low temperature and fractionates it for separation into oxygen ($O_2$) gas and nitrogen ($N_2$) gas, and is suitable for obtaining high-purity oxygen gas. As the air used in the oxygen separation unit 62, compressed air to be used for combustion in the gas turbine, which will be described later, is utilized.

Figure 3:
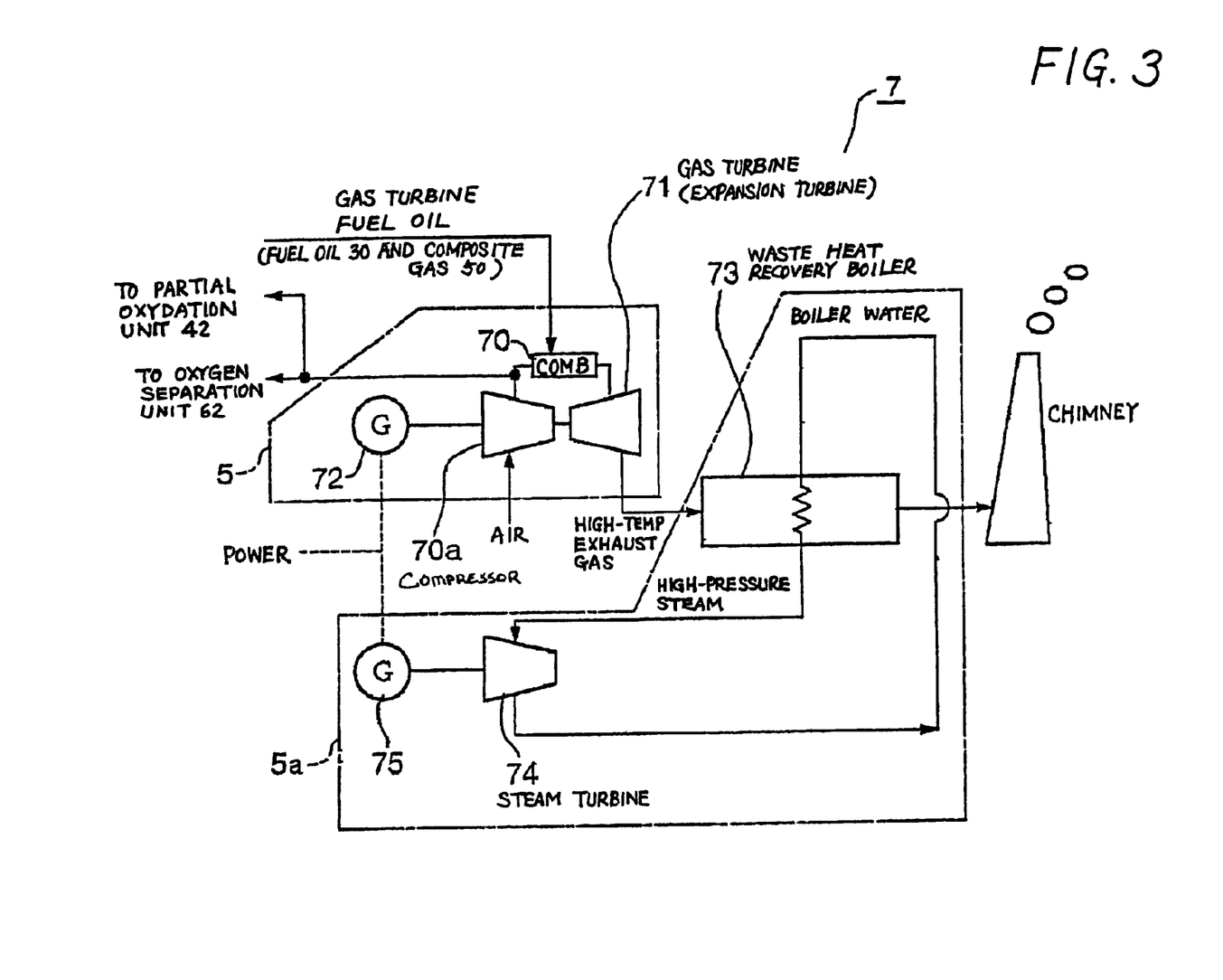
FIG. 3 is a diagram schematically showing one example of a power generation system incorporated in the oil fuel burning integrated combined cycle power generation system shown in FIG. 1.

FIG. 3 is a diagram schematically showing one example of the power generation system 7 incorporated in the oil fuel burning integrated combined cycle power generation system shown in FIG. 1.

In FIG. 3, the power generation system 7 is in the form of a combined cycle power generation system in which a gas turbine (expansion turbine) 71 and a steam turbine 74 are combined. Air is compressed by a compressor 70a rotating coaxially with the gas turbine 71. The compressed air is fed to a combustor 70 to burn gas turbine fuel, thereby to drive the gas turbine 71 by combustion gas so that the power is generated in a generator 72.

The compressed air obtained through the compressor 70a is fed to the oxygen separation unit 62 via a pipe arrangement which is branched upstream of the combustor 70. Specifically, the compressor 70a feeds the compressed air of, for example, about 20 to 30 kg/cm2 for combustion in the combustor 70, and part of this compressed air is also fed to the oxygen separation unit 62.

On the other hand, high-temperature exhaust gas discharged from the gas turbine 71 is fed to a waste heat recovery boiler 73, thereby to generate steam by heat of the exhaust gas. The steam drives the steam turbine 74 so that the power is generated in a generator 75. Although the turbines 71 and 74 have their own output shafts in FIG. 3, they may also be arranged coaxially with each other.

In FIG. 3, the combustor 70, the compressor 70a, the gas turbine 71 and the generator 72 constitute the gas turbine power generation system 5, while the waste heat recovery boiler 73, the steam turbine 74 and the generator 75 constitute a steam turbine power generation system 5a.

FIG. 3 shows only one gas turbine 71 in the gas turbine power generation system 5. On the other hand, it may also be arranged that a plurality of gas turbines are provided and the number of the gas turbines to be operated is controlled to adjust the power generation amount depending on demand.

In the example of FIG. 3, the fuel oil 30 in a liquid phase and the syngas 50 in a gaseous phase are simultaneously supplied to the gas turbine 71 for mixed combustion.

Figure 4:
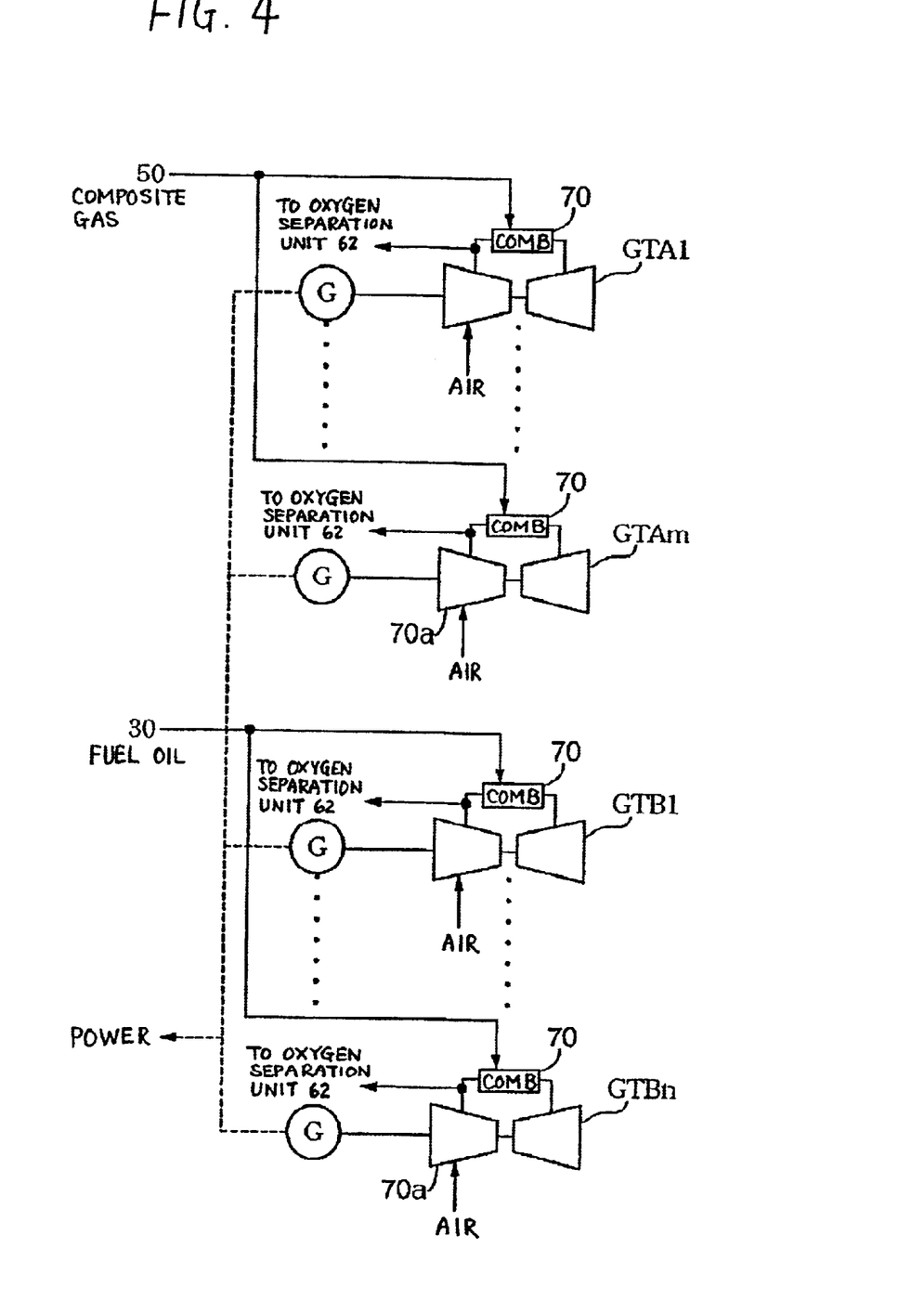
FIG. 4 is a diagram schematically showing another example of a power generation system incorporated in the oil fuel burning integrated combined cycle power generation system shown in FIG. 1.

FIG. 4 is a diagram schematically showing another example of the power generation system 7 incorporated in the oil fuel burning integrated combined cycle power generation system shown in FIG. 1.

In FIG. 4, the gas turbine power generation system 5 includes m gas turbines GTA1 to GTAm each using the syngas 50 as fuel, and n gas turbines GTB1 to GTBn each using the fuel oil 30 as fuel. Although not shown, the steam turbine power generation system 5a is also provided as in the example of FIG. 3.

In the example of FIG. 4, the gas turbines GTA1 to GTAm are driven for a base load, i.e. for a firm output, while the gas turbines GTB1 to GTBn are driven for an auxiliary output for supplementing the firm output when demand is higher.

The syngas (CO+$H_2$) 50 adjusted in pressure is fed to the gas turbines GTA1 to GTAm via a pipe arrangement so that the power generation is carried out. Since the syngas is used as basic fuel, it is constantly supplied to the gas turbines GTA1 to GTAm regardless of a magnitude of demand, for example, even during the night when the demand is small. In this embodiment, since about 60 to 80 vol % of the feed oil is produced as gas turbine fuel oil, when large-scale power generation is required, part of the fuel oil is used as auxiliary fuel for adjusting the power generation amount. In this case, the fuel oil is fed from the intermediate tank 32 to one or more of the gas turbines GTB1 to GTBn according to variation in demand. With this arrangement, it can cover the power generation from small scale to large scale, and the power supply is ensured even during the peak demand.

According to the foregoing preferred embodiment of the present invention, the feed oil 1 is separated into the light portion and the heavy portion wherein the light portion is used for obtaining the gas turbine fuel oil, and the heavy portion is gasified to obtain the syngas which is used as gas turbine fuel. Thus, one unit calorie of the feed oil can be utilized as gas turbine fuel with essentially no waste so that the high power generation efficiency can be achieved. Further, since essentially no waste matter is produced, it is also good for the environment.

Further, as in the example of FIG. 4, all the syngas which is difficult to store is used as fuel for the base load power generation, while the gas turbine fuel oil which can be stored in the intermediate tank is used for the auxiliary power generation for supplementing the power generation based on the syngas, for example, during the peak demand. Thus, it can cover the wide range of power demand.

Further, the oxygen separation unit 62 feeding oxygen to the partial oxidation unit 42 is suitable for a continuous operation since it includes the low-temperature process and thus dislikes frequent. start/stop operations. In addition, bricks forming the reactor 43 in the partial oxidation unit 42 are brittle when the temperature changes frequently. In view of this, it is advantageous to use the syngas 50 as basic fuel.

When producing gaseous high-concentration oxygen, the air low-temperature processing unit requires the compressed air of, for example, at least about 5 kg/$cm^2$. In this embodiment, since the compressor 70a for feeding the compressed air to the gas turbine is also used as a means for feeding the compressed air to the oxygen separation unit, it is not necessary to separately provide a compressing means. Since an air compressor is expensive, it is advantageous in view of cost. Other than the air low-temperature processing unit, an oxygen producing unit using, for example, a PSA (pressure swing adsorption) method may be used as the oxygen separation unit 62. This oxygen producing unit separates oxygen gas from air using a nitrogen adsorption agent to absorb nitrogen according to the PSA method, and is suitable for a case where the amount of oxygen necessary for partial oxidation is 10000 $Nm^3/h$ or less. Since the compressed air is also required, it is advantageous to use the compressor 70a for feeding the compressed air to the oxygen producing unit.

In the foregoing preferred embodiment of the present invention, the relatively high-quality Arabian extra light crude oil is used as the feed oil 1, and the separation system 2 performs the deep drawing. However, depending on the quality of the feed oil 1, for example, the contents of impurities such as vanadium or nickel, the ratio of a light portion to be extracted by the separation system 2 changes. Under the present conditions, since vanadium damages gas turbine blades, it is necessary to change the separation ratio of a light portion (the degree of drawing) depending on the contents of vanadium in the feed oil, thereby to suppress the contents of vanadium in the refined oil obtained through the hydrotreating. Since the nature, such as the viscosity, of a heavy portion (residue) also changes depending on the degree of drawing, it is necessary to select a pretreating method for the residue according to the nature thereof. Thus, depending on a kind of the feed oil, the recovery rate of a light portion from the feed oil is controlled, and as a result, the recovery rate of a heavy portion as a residue also changes.

In the foregoing preferred embodiment of the present invention, the heavy oil obtained in the fuel producing process is used as fuel in the gasification process. However, a pretreatment is carried out according to the nature of the heavy oil. Specifically, when the pitch softening point of the heavy oil exceeds 140° C., the heavy oil is comminuted and added with water and a dispersing agent to be formed into uniformly dispersed/mixed water slurry fuel. When the pitch softening point of the heavy oil is higher than 110° C. and no higher than 140° C., the heavy oil is uniformly mixed in a melted state with an emulsifier to be formed into emulsion fuel. Further, when the pitch softening point of the heavy oil is no higher than 110° C., the pretreatment is not performed and the heavy oil is fed to the gasification process as fuel while keeping fluidity in a high-temperature state.

For example, when the Arabian light crude oil is used as the feed oil 1, the pitch softening point of the heavy portion 29 fed to the gasification system 4 becomes about no less than 110° C. and no higher than 140° C. (middle drawing degree). Accordingly, the emulsion pretreatment may be carried out to form the heavy oil 29 into emulsion fuel. On the other hand, for example, when the Arabian heavy crude oil is used as the feed oil 1, the heavy portion 29 becomes no higher than 30 cSt in viscosity at 300° C. and no higher than 110° C. in softening point (shallow drawing degree). In this case, the heavy portion 29 may be heated and kept in a high-temperature state, and then fed to the partial oxidation unit 42 without the pretreatment as shown by a dotted line A in FIG. 1 while keeping fluidity.

It may be arranged that the combustor of the gas turbine in the gas turbine power generation system 5 is provided with a fuel oil feed nozzle and a syngas feed nozzle, and a supply of the syngas is constantly performed while a supply of the fuel oil is performed when necessary.

In the foregoing preferred embodiment, "essentially all the amount" represents all the amount excluding a small amount reduced in the separation process, the refining process, the gasification process and so on, and a self-consumption amount used for operation of the system itself.

In the foregoing preferred embodiment, pure oxygen with approximately 100% oxygen concentration is used for partial oxidation in the partial oxidation unit 42. Instead of it, air with 30% oxygen concentration or oxygen-enriched air with intermediate oxygen concentration between 30% and 100% may be used.

When the air is used, the oxygen separation unit 62 which is expensive is not required so that the system is simplified in structure and reduced in cost.

EXAMPLE 1

10000 bbl/D atmospheric residue oil of the Arabian extra light crude oil including 11 ppm heavy metal was used as feed oil, and fuel was produced using the oil fuel burning integrated combined cycle power generation system shown in FIG. 1, resulted in recovery of 84 vol % refined oil. The refined oil is temporarily stored in the tank and utilized as gas turbine fuel oil during the peak power demand. On the other hand, a 13 vol % oil pitch obtained from a heavy portion (residue) was high (150° C.) in softening point and was thus formed into a water slurry which was then gasified into syngas in the partial oxidation unit to be used as basic fuel in the gas turbine power generation system. When the combined cycle power generation is carried out in combination with the gas turbine power generation and the steam turbine power generation, the system generates about 30 MW using only the basic fuel, while it can generate 330 MW at maximum in combination with the gas turbine fuel oil.

EXAMPLE 2

10000 bbl/D atmospheric residue oil of the Arabian light crude, oil including 32 ppm heavy metal was used as feed oil, and fuel was produced using the oil fuel burning integrated combined cycle power generation system shown in FIG. 1, resulted in recovery of 76 vol % refined oil. The refined oil is temporarily stored in the tank and utilized as gas turbine fuel oil during the peak power demand. On the other hand, a 21 vol % oil pitch obtained from a heavy portion (residue) was low (130° C.) in softening point and thus was not suitable for being formed into a water slurry. Accordingly, the oil pitch was formed into emulsion by a mixer and then gasified into syngas in the partial oxidation unit to be used as basic fuel in the gas turbine power generation system. When the combined cycle power generation is carried out as in Example 1, the system generates about 50 MW using only the basic fuel, while it can generate 320 MW at maximum in combination with the gas turbine fuel oil.

EXAMPLE 3

10000 bbl/D atmospheric residue oil of the Arabian heavy crude oil including 110 ppm heavy metal was used as feed oil, and fuel was produced using the oil fuel burning integrated combined cycle power generation system shown in FIG. 1, resulted in recovery of 66 vol % refined oil. The refined oil is temporarily stored in the tank and utilized as gas turbine fuel oil during the peak power demand. On the other hand, a 32 vol % oil pitch obtained from a heavy portion (residue) was 80° C. in softening point and 24 cSt in viscosity at 300° C. and was thus transferable in a high-temperature state. Accordingly, the oil pitch was directly sent to the partial oxidation unit while kept in the high-temperature state, and gasified into syngas to be used as basic fuel in the gas turbine power generation system. When the combined cycle power generation is carried out as in Example 1, the system generates about 70 MW using only the basic fuel, while it can generate 310 MW at maximum in combination with the gas turbine fuel oil.

While the present invention has been described in terms of the preferred embodiment, the invention is not to be limited thereto, but can be embodied in various ways without departing from the principle of the invention as defined in the appended claims.

What is claimed is:

1. An oil fuel burning integrated combined cycle power generation system comprising:

a fuel producing system comprising a separation means for separating feed oil composed of a crude oil and/or heavy oil into a light portion and a heavy portion, and a refining means for refining the light portion to obtain fuel oil;

a gasification system for gasifying the heavy portion to produce syngas containing hydrogen gas and carbon monoxide gas;

a gas turbine power generation system for driving a gas turbine using the fuel oil and the syngas as fuel to carry out power generation; and     a steam turbine power generation system for driving a steam turbine using steam produced by heat recovered from exhaust gas of the gas turbine to carry out power generation.

2. The oil fuel burning integrated combined cycle power generation system according to claim 1, wherein the fuel producing system comprises a tank for storing the fuel oil, and the gas turbine power generation system requires a constant supply of the syngas from the gasification system as basic fuel and further requires a supply of the fuel oil from the tank as auxiliary fuel for adjusting a power generation amount depending on power demand.

3. The oil fuel burning integrated combined cycle power generation system according to claim 1, wherein the separation means comprises a distillation means and a solvent deasphalting means, and wherein the refining means comprises a hydrotreating unit for refining the light portion to satisfy a gas turbine fuel specification.

4. The oil fuel burning integrated combined cycle power generation system according to claim 1, wherein the gas turbine power generation system comprises a compressor connected to the gas turbine for producing compressed air to be fed to a combustor of the gas turbine, and wherein the gasification system carries out partial oxidation of the heavy portion using the compressed air fed from the compressor.

5. The oil fuel burning integrated combined cycle power generation system according to claim 1, further comprising an oxygen separation unit provided between the gas turbine power generation system and the gasification system, wherein the gas turbine power generation system comprises a compressor connected to the gas turbine for producing compressed air to be fed to a combustor of the gas turbine, wherein the oxygen separation unit carries out low-temperature separation of oxygen from part of the compressed air fed from the compressor, and wherein the gasification system carries out partial oxidation of the heavy portion using oxygen fed from the oxygen separation unit.

6. The oil fuel burning integrated combined cycle power generation system according to claim 1, further comprising an oxygen producing unit for separating oxygen from air using a pressure swing adsorption method, wherein the gasification system carries out partial oxidation of the heavy portion using oxygen fed from the oxygen producing unit.

7. The oil fuel burning integrated combined cycle power generation system according to claim 1, wherein the separation means comprises a distillation means and a solvent deasphalting means, wherein the heavy portion fed to the gasification system is a residue separated by the solvent deasphalting means from a heavy portion of the feed oil obtained by the distillation means, and wherein the residue is uniformly dispersed into water and fed to the gasification system as water slurry fuel.

8. The oil fuel burning integrated combined cycle power generation system according to claim 1, wherein the gas turbine power generation system has a power generation capacity which is greater than a power generation amount obtainable by using all the amount of the syngas produced in the gasification system.

9. The oil fuel burning integrated combined cycle power generation system according to claim 1, wherein the gas turbine power generation system carries out mixed combustion of the fuel oil in a liquid phase and the syngas in a gaseous phase.

10. The oil fuel burning integrated combined cycle power generation system according to claim 1, wherein the gas turbine power generation system comprises a plurality of gas turbines including the gas turbines each driven by the syngas and the gas turbines each driven by the fuel oil.

11. The oil fuel burning integrated combined cycle power generation system according to claim 10, wherein the syngas is constantly fed to the corresponding gas turbines as basic fuel, while the fuel oil is fed to the corresponding gas turbines as auxiliary fuel for adjusting a power generation amount depending on power demand.

12. An oil fuel burning integrated combined cycle power generation method comprising:
 a fuel producing step of separating essentially all the amount of feed oil composed of a crude oil and/or heavy oil into a light portion satisfying a gas turbine fuel specification and a heavy portion being a residue of the feed oil after separation of the light portion therefrom;
 a gasification step of gasifying essentially all the amount of the heavy portion through partial oxidation to produce syngas containing hydrogen gas and carbon monoxide gas;
 a gas turbine power generation step of carrying out power generation based on essentially all the amount of the syngas supplied as basic fuel and further based on the light portion supplied as auxiliary fuel for adjusting a power generation amount depending on power demand; and
 a steam turbine power generation step of carrying out power generation using steam produced by high-temperature exhaust gas obtained in the gas turbine power generation step.

13. The oil fuel burning integrated combined cycle power generation method according to claim 12, wherein the gasification step disperses the heavy portion into water uniformly to form water slurry fuel when the heavy portion obtained in the fuel producing step has a softening point higher than 140° C., and then gasifies the water slurry fuel to produce the syngas, wherein the gasification step forms the heavy portion into emulsion fuel when the softening point is higher than 110° C. and no higher than 140° C., and then gasifies the emulsion fuel to produce the syngas, and wherein the gasification step keeps the heavy portion as it is in a high-temperature state when the softening point is no higher than 110° C., and then gasifies the heavy portion to produce the syngas.

14. The oil fuel burning integrated combined cycle power generation method according to claim 12, wherein the fuel producing step comprises a distillation separating step, a solvent deasphalting separation step and a refining step for refining through a hydrotreatment the light portion obtained through the distillation separating step and the solvent deasphalting separation step.

15. The oil fuel burning integrated combined cycle power generation method according to claim 12, wherein the gasification step uses compressed air produced in the gas turbine power generation step to carry out the partial oxidation.

16. The oil fuel burning integrated combined cycle power generation method according to claim 12, further comprising the step of producing oxygen through low-temperature separation from compressed air produced in the gas turbine power generation step, wherein the gasification step carries out the partial oxidation using the produced oxygen.

17. The oil fuel burning integrated combined cycle power generation method according to claim 12, further comprising the step of producing oxygen using a pressure swing adsorption method, wherein the gasification step carries out the partial oxidation using the produced oxygen.

18. The oil fuel burning integrated combined cycle power generation method according to claim 12, wherein the fuel producing step comprises a distillation separating step of separating the feed oil into a first light portion and a first heavy portion, and a solvent deasphalting separation step of separating the first heavy portion into a second light portion and a second heavy portion whose pitch softening point is higher than 140° C., and wherein the gasification step disperses the second heavy portion into water uniformly to produce water slurry fuel, and then gasifies the water slurry fuel through the partial oxidation.

19. The oil fuel burning integrated combined cycle power generation method according to claim 12, wherein the gas turbine power generation step carries out mixed combustion for simultaneously burning the light portion in a liquid phase and the syngas in a gaseous phase.

20. The oil fuel burning integrated combined cycle power generation method according to claim 12, wherein the gas turbine power generation step separately carries out the power generation using the syngas and the power generation using the light portion, and wherein the power generation using the syngas is carried out as basic power generation, while the power generation using the light portion is carried out as auxiliary power generation for supplementing the basic power generation.

* * * * *